A. DOUGHERTY.
FISHING LINE REEL.
No. 41,494. Patented Feb. 9, 1864.
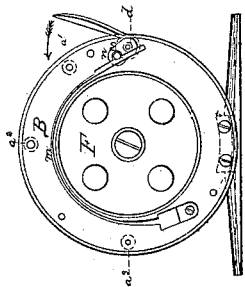
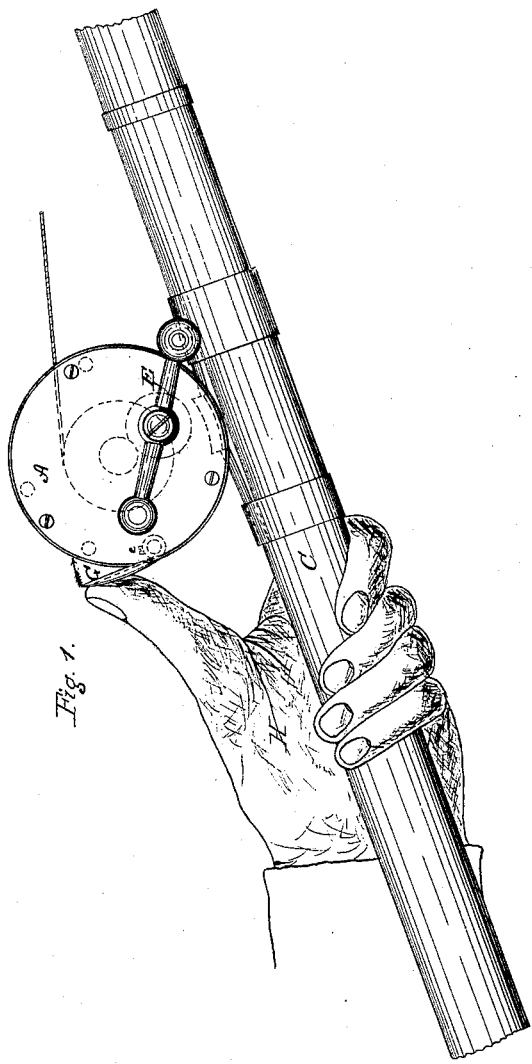
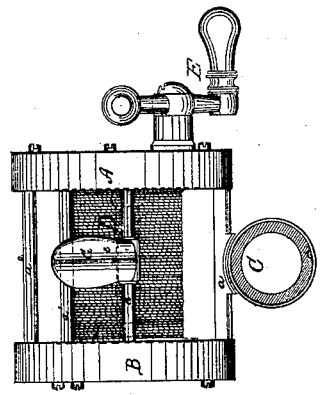
Witnesses.
Inventor.
Andrew Dougherty

UNITED STATES PATENT OFFICE.

ANDREW DOUGHERTY, OF BROOKLYN, NEW YORK.

IMPROVEMENT IN FISHING-LINE REELS.

Specification forming part of Letters Patent No. 41,494, dated February 9, 1864.

*To all whom it may concern:*

Be it known that I, ANDREW DOUGHERTY, of Brooklyn, in the county of Kings and State of New York, have invented certain new and useful Improvements in Anglers' Reels; and I do hereby declare that the following is a full, clear, and exact description of my invention, reference being had to the accompanying drawings, in which—

Figure 1 represents an elevation of one of my improved reels applied to a portion of a fishing-rod. Fig. 2 represents a face view of the same; and Fig. 3 represents an end view of the reel with the cap removed to show the mechanism within the head.

Anglers' reels have heretofore been constructed with devices for controlling the speed at which the fishing-line could be drawn off by a fish; but from defects in the construction or plan such reels have not been used to any extent, and anglers at the present day prefer to control the unwinding of the line by the pressure of the thumb upon the line, although the thumb is frequently injured by the friction of the line, and many fine fish are lost from the inability of the angler to control the line by this means.

The object of my invention is to provide an efficient means for controlling the delivery of line so arranged that it does not interfere with the winding-up mechanism, and that the angler may operate the controlling mechanism by the same hand which holds the rod.

To this end the first part of my invention consists of the combination of the spool for the fishing-line with mechanism at one end of it for winding-up the line by a crank, and with a friction-brake arranged at the end of the spool opposite the winding mechanism to control the unwinding of the line, so that the controlling and winding mechanisms, which are arranged at opposite ends of the spool, do not interfere with each other.

The second part of my invention consists of the combination of the friction-brake which controls the unwinding of the spool with a lever-handle or thumb-plate placed between the heads of the reel-frame in a position to be acted upon by the thumb of the hand which holds the fishing-rod when the reel is applied to it.

The third part of my invention consists of the combination and arrangement of the lever-handle that operates the controlling mechanism with one of the cross-bars of the reel, or its equivalent, in such manner that the extent of movement of said lever is limited, whereby the application of a sufficient retarding force to break the fishing-line is prevented.

The fourth part of my invention consists of a double-headed reel-frame, or, in other words, of a reel-frame with two hollow heads, one of which is suitable for containing the winding mechanism, and the other the controlling mechanism.

All parts of my invention are embodied in the angler's reel represented in the annexed drawings. The frame of this reel is composed of two hollow heads, A and B, connected by cross-bars $a\ a'\ a^2\ a^3$, one of which, $a$, forms the base by which the reel is connected to the fishing-rod C. The spool D, on which the line is wound, is made of the usual form, and is fitted to an arbor which passes into the two heads of the reel-frame. One of these heads, A, contains the winding mechanism, consisting of a cog-pinion secured to the spool-arbor (shown by dotted lines in Fig. 1) and a cog-wheel secured to a counter-shaft which extends through the head and is fitted with the crank E, to which the hand is applied for the purpose of winding up the line. The other head, B, of the frame contains the friction-brake, which is composed of a spring-strap, $m$, partially encircling a smooth-rimmed wheel, F, secured to the arbor of the spool D. One end of the brake-strap $m$ is fastened to the reel-frame. The other end is connected with the outer end of an arm, $n$, which is secured to one end of a rock-shaft, $d$. This rock-shaft extends from one head of the reel to the other, and it is fitted at its center with an upright thumb-plate, G, so that the thumb-plate, rock-shaft, and arm $n$ constitute a lever by means of which the friction-strap $m$ can be borne upon the periphery of the brake-wheel F, so as to control the revolution of the spool D when the line is being drawn off. The thumb-plate G is arranged, as represented in the drawings, so that the angler can apply his thumb to the controlling mechanism without removing his hand H from the rod. The thumb-plate G is secured to its rock-shaft $d$ by a set-screw, $e$, and it is arranged opposite one of the cross-bars, $a'$, of the reel-frame, so that this cross-bar limits the distance to which the thumb-plate can be moved, and consequently the pressure of the strap upon the brake-wheel, while the set-screw permits the position of the thumb-plate upon its shaft to be varied, so that the extent to which the friction-strap is strained when the movement of the thumb-plate is arrested, and consequently the degree of strain upon the line, can be adjusted to the strength of the line. In place of connecting the thumb-plate with its rock-shaft by means of a set-screw the same result may be obtained by securing the arm $n$ to the shaft by means of a set-screw, or by making the fastening of the fixed end of the brake-strap adjustable.

When the reel thus constructed is in use the angler may hold the rod with his hand in such a position that the thumb of that hand can be applied to the thumb-plate of the controlling mechanism, so that he can control the running out of the line the instant he ceases to wind it up by the application of his other hand to the crank-handle.

Having thus described an angler's reel embodying all parts of my invention in the best form known to me, what I claim as my invention in anglers' reels, and desire to secure by Letters Patent, is—

1. The combination and arrangement of the spool for the fishing-line with a winding mechanism at one end of it, and with a friction-brake at the other end of it and opposite the winding mechanism, the whole operating substantially as set forth.

2. The combination of the friction-brake that controls the unwinding of the line with a thumb-plate or lever-handle placed between the heads of the reel-frame, substantially as set forth.

3. The combination of the lever-handle that operates the controlling mechanism of the spool with one of the cross-bars of the frame, substantially as set forth.

4. A double-headed frame for an angler's reel, constructed substantially as set forth.

In testimony whereof I have hereto subscribed my name.

ANDREW DOUGHERTY.

Witnesses:
 J. R. COOPER,
 E. E. COOPER.